March 24, 1959 — J. H. ELLIS — 2,879,117
PISTON RING EXPANDER
Filed March 14, 1957

INVENTOR.
John H. Ellis
BY
L. D. Burch
ATTORNEY

United States Patent Office 2,879,117
Patented Mar. 24, 1959

2,879,117

PISTON RING EXPANDER

John H. Ellis, Indianapolis, Ind., assignor to General Motors Corporation, Detroit, Mich., a corporation of Delaware Application March 14, 1957, Serial No. 646,099

10 Claims. (Cl. 309—41)

The invention relates to an expander for piston rings and more particularly to an expander which is fabricated from a single strip of material. The conventional wave-type expander has a tendency to bridge away from the piston ring groove since its points of contact with the ring and the bottom of the groove must move circumferentially to accommodate expander deflection. This movement adversely effects the piston ring conformation to the piston wall in areas remote from the point of local deflection. Piston ring expanders embodying the invention eliminate this circumferential movement, permitting the piston ring to conform more closely to the cylinder wall at all points about its circumference. Local deflections will in such expanders have no effect on piston ring conformation to the cylinder wall at other points, thereby insuring a more uniformly distributed and constant pressure between the piston ring and the cylinder wall along the entire periphery of the piston ring.

Figure 1:
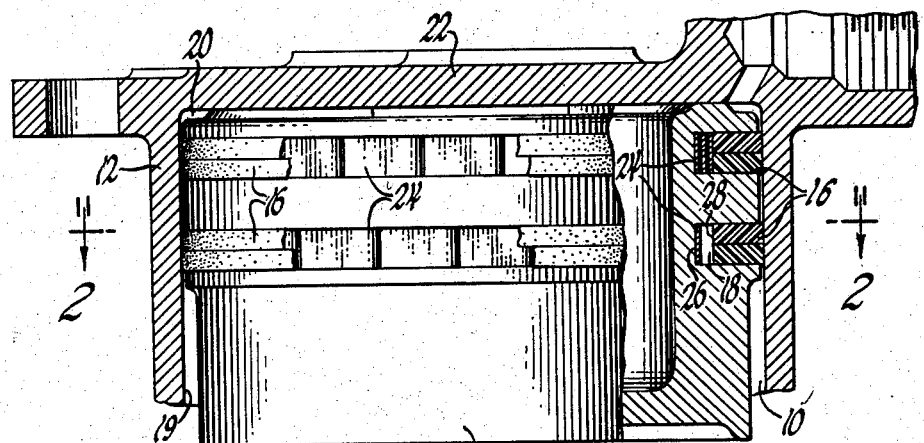
Figure 1 shows a portion of a piston and cylinder assembly having piston ring expanders embodying the invention, parts being broken away and in section.

Piston ring expanders in which the invention is embodied are illustrated in combination with a piston and cylinder construction common to servo motors, pumps, etc., in which piston rings may be used. The piston rings shown are of a suitable plastic. However, the expanders are equally applicable to other mechanisms such as pistons and rings for internal combustion engines.

Cylinder 10 is provided in a block 12 and is adapted to receive a piston 14. Piston 14 may be reciprocated within cylinder 10 and is provided with one or more piston rings 16. Rings 16 are accommodated within ring grooves 18 which are peripherally formed in piston 14. The piston rings are normally in sliding engagement with the side wall 19 of cylinder 10 in order to seal chamber 20, formed by piston 14 and the top 22 of cylinder 10, from the lower end of the cylinder. In order to maintain piston rings 16 in contact throughout their peripheries, piston ring expanders 24 are provided in the inner sections of the ring grooves 18. Each expander is intermediate and in contact with the bottom 26 of each ring groove 18 and the inner periphery 28 of each piston ring 16. The expanders are radially compressed after installation and exert radially outward pressure against the piston rings 16 to hold them against cylinder side wall 19.

Figure 2:
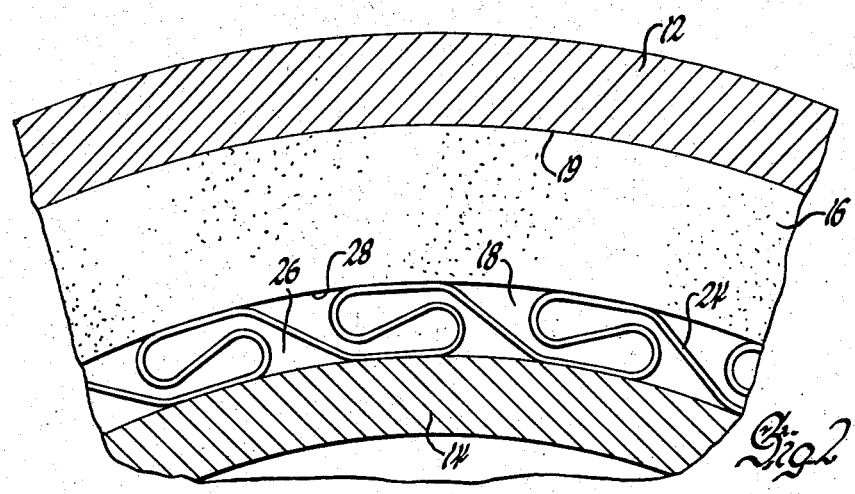
Figure 2 is a fragmentary view taken in the direction of arrows 2—2 of Figure 1, with parts in section.
Figure 3:
Figure 3 is a perspective view of a portion of a piston ring expander embodying the invention.

Piston ring expander 24 acts at many uniformly distributed points along the inner periphery of the ring to constantly push ring 16 against cylinder side wall 19. As shown in Figures 2 and 3, the expander is fabricated as a series of open teardrop loops connected to form S-shaped portions. Each portion is comprised of two open loops, one positioned radially outward from the other, and connecting sections. When the expander is compressed, each of the loops distort to a more pronounced teardrop shape and may normally be so distorted until the bent portions of each loop very nearly close upon the loop connecting sections. When the expander is formed, it includes a first inner open teardrop loop 30 and an outer open teardrop loop 32 which is radially outward from loop 30 and with its bending center displaced arcuately in relation to that loop. A straight section 34 is furnished to provide an interconnecting surface between the bent portions of each of the loops 30 and 32. Straight section 34 extends nontangentially through a circle which defines the median circumference of the expander when the expander is annularly formed. The outer end of loop 32 is extended along the expander outer periphery to provide an outer flat section 36. The inner loop 30 is extended along the inner periphery of the expander to provide an inner flat section 38. Outer flat section 36 extends from loop 32 to a point radially outward of the bent portion of loop 30 and bent angularly inward and circumferentially away from loop 30 to form connecting section 40. Section 40 connects two adjacent S-shaped expander sections which are formed by loops 30 and 32 and sections 34, 36 and 38. Section 40 terminates at the end of inner flat section 38 of the adjacent S section and the pattern is repeated. The expander, therefore, is provided with outer open teardrop loops 32 which form a circumferential series with each of the outer loops pointing in the same circumferential direction. Each of the inner open teardrop loops 30, on the other hand, form a series of circumferentially extending loops which point in the opposite circumferential direction from loops 32.

A section of the expander is shown in Figure 3 in its fully extended position. Each of the open ends of the loops is radially spaced from the adjacent reverse bent portion of its companion loop. The diameter of each loop, taken in a direction radially of the expander, is larger than the open portion of the loop taken along the same expander radius.

The expander of Figure 3 is shown in position in Figure 2 with the expander loaded to its maximum point. Each of the reverse bends forming each of the loops is, at its outer surface, very nearly in engagement with the adjacent flat section. It is preferred that the expander being so proportioned that under maximum compression normally encountered the loops 30 and 32 will not close.

Figure 4:
Figure 4 is a perspective view of a modification of the expander of Figure 3.

A modification of the expander of Figure 3 is illustrated in Figure 4. The inner open teardrop loop 42 is formed by reverse bending a portion of the expander strip with one side of the open loop forming an inner support flat section 44 and the other side of the loop forming a straight section 46 which also provides the inner side of the outer open teardrop loop 48. The outer side of loop 48 forms an outer support flat section 50 which also acts as a connecting section for connecting adjacent S configuration sections. Alternate S sections are formed with the same S cross section and the intermediate S sections are formed with a reverse S cross section. Each of the outer loops 48, therefore, alternately extends in opposite circumferential directions as does each of the inner loops 42. The outer section 50 is positioned in engagement with the inner periphery of piston ring 16 and the inner section 44 engages the bottom 26 of the ring groove 18. The loops 42 and 48 each occupy substantially more than half the radial thickness of the expander when the expander is in a free position. As the expander is compressed, each loop occupies a proportionally greater part of the radial thickness of the expander although it is preferred that the expander be so proportioned that loops 42 and 48 do not close completely during normal action of the expander.

The expander's spring action is due to the distortion of the open loops. As each loop is compressed, radially outward forces are exerted on piston ring 16 at outer flat sections 36 of the expander Figure 3 and outer flat supports 50 of the expander Figure 4. When the expander is deflected, none of the ring or groove contact surfaces are require to move circumferentially since the forces causing such motion in the well-known wave type expander are absorbed by the spring action of the loops.

The expander may be formed as a continuous strip and circumferentially shaped to provide a continuous expander, the inner and outer flat sections then assuming arcuate cross sections. The joint may be welded, crimped, soldered, brazed or otherwise fastened together to eliminate free ends.

An improved piston ring expander has thus been disclosed which distributes radial expanding forces evenly to a piston ring without bridging. The expander may be readily installed by taking advantage of the elastic garter effect. It may be radially expanded until it will clear the piston skirt or head and lands easily. It will return to its normal position when released.

What is claimed is:

1. A continuous strip piston ring expander having parts reversely bent to form inner open loops and outer open loops, the diameter of the closed portion of each of said loops taken radially of the expander being substantially greater than half the radial thickness of said expander when said expander is in a free position, one of said inner open loops having a first side and a second side, said first side constituting an inner flat section, said second side being non-parallel to said first side and constituting a straight section forming the inner side of one of said outer open loops, said one outer open loop having an outer side substantially parallel to said one inner loop first side, and a connecting section for connecting one of said loops to a circumferentially spaced loop opening in a circumferential direction opposite to said one loop.

2. In a continuous strip piston ring expander, circumferentially spaced and connected S-shaped portions, each of said portions being comprised of adjacent radially spaced oppositely extending open teardrop loops having inner and outer sides, the inner side of the inner of said loops being arcuately parallel to the outer side of the outer of said loops, the outer side of said inner loop and the inner side of said outer loop being a common element.

3. In a continuous strip piston ring expander, circumferentially spaced and connected S-shaped portions, each of said portions being comprised of adjacent radially spaced oppositely extending open teardrop loops having inner and outer sides, the inner side of the inner of said loops being arcuately parallel to the outer side of the outer of said loops, the outer side of said inner loop and the inner side of said outer loop being a common element, said outer loop outer side being connected to a circumferentially adjacent inner loop inner side.

4. In a continuous strip piston ring expander, circumferentially spaced and connected S-shaped portions, each of said portions being comprised of adjacent radially spaced oppositely extending open teardrop loops having inner and outer sides, the inner side of the inner of said loops being arcuately parallel to the outer side of the outer of said loops, the outer side of said inner loop and the inner side of said outer loop being a common element, said outer loop outer side being connected to a circumferentially adjacent outer loop outer side and said inner loop inner side being connected to a circumferentially adjacent inner loop inner side.

5. In a continuous strip piston ring expander, circumferentially spaced and connected S-shaped portions, each of said portions being comprised of adjacent radially spaced oppositely extending open teardrop loops having inner and outer sides, the diameter of the closed portion of each loop taken radially of the expander being greater than the radially extending open portion of each of said loops, the inner side of the inner of said loops being arcuately parallel to the outer side of the outer of said loops, the outer side of said inner loop and the inner side of said outer loop being a common element, said outer loop outer side continuously extending and integrally connected to a circumferentially adjacent S-shaped portion.

6. In a continuous strip piston ring expander, circumferentially spaced and connected S-shaped portions, each of said portions being comprised of adjacent radially spaced oppositely extending open teardrop loops having inner and outer sides, the diameter of the closed portion of each of said loops taken radially of the expander being substantially greater than the radially extending open portion thereof, the inner side of the inner of said loops being arcuately parallel to the outer side of the outer of said loops, the outer side of said inner loop and the inner side of said outer loop being a common element, any one of said S-shaped portions having a reversed S pattern relative to adjacent S-shaped portions.

7. In a continuous strip piston ring expander, circumferentially spaced and connected S-shaped portions, each of said portions being comprised of adjacent radially spaced oppositely extending open teardrop loops having inner and outer sides, the inner side of the inner of said loops being arcuately parallel to the outer side of the outer of said loops, the outer side of said inner loop and the inner side of said outer loop being a common element, alternate S-shaped portions having a reverse S pattern in relation to adjacent portions, each of said outer loop outer sides being integrally co-extensive with a circumferentially adjacent outer loop outer side.

8. In a continuous strip piston ring expander, circumferentially spaced and connected S-shaped portions, each of said portions being comprised of adjacent radially spaced oppositely extending open teardrop loops having inner and outer sides, the inner side of the inner of said loops being arcuately parallel to the outer side of the outer of said loops, the outer side of said inner loop and the inner side of said outer loop being a common element, adjacent S-shaped portions having relatively reverse S pattern, each of said inner loop inner sides being circumferentially co-extensive with a circumferentially adjacent inner loop inner side.

9. An annular continuous strip piston ring expander having reverse bent formed inner open teardrop loops and outer open teardrop loops constituting circumferentially adjacent S-shaped sections, the sum of the maximum diameters of the closed portions of adjacent loops taken radially of the expander being substantially greater than the radial thickness of said expander, each of said outer loops having an outer side, each of said inner loops having an inner side radially spaced from and arcuately parallel to said outer side, a common connecting side between radially adjacent loops and an integral connecting section between each of said radially adjacent loops and a loop in one of said circumferentially adjacent S-shaped sections.

10. An annular continuous strip piston ring expander having reverse bent formed inner open teardrop loops and outer open teardrop loops constituting circumferentially adjacent S-shaped sections, each of said outer loops having an outer side, each of said inner loops having an inner side radially spaced from and arcuately parallel to said outer side, a common connecting side between radially adjacent loops and an integral connecting section between each of said radially adjacent loops and a loop in one of said circumferentially adjacent S-shaped sections, said common connecting side extending non-tangentially through a circle defining the median circumference of said expander.

References Cited in the file of this patent

UNITED STATES PATENTS

| | | |
|---|---|---|
| 2,397,900 | Zetnick | Apr. 2, 1946 |
| 2,635,933 | Engelhardt | Apr. 21, 1953 |

FOREIGN PATENTS

| | | |
|---|---|---|
| 5,498 | Great Britain | Dec. 15, 1881 |